United States Patent
Newburgh

[11] 3,791,738
[45] Feb. 12, 1974

[54] RING LASER UTILIZING AN OPTICAL RETARDATION PLATE TO PREVENT BEAM LOCKING

[75] Inventor: Ronald G. Newburgh, Belmont, Mass.

[73] Assignee: The United States of America as represented by the Secretary of the United States Air Force, Washington, D.C.

[22] Filed: Apr. 11, 1973

[21] Appl. No.: 350,260

Related U.S. Application Data

[63] Continuation-in-part of Ser. No. 248,754, April 28, 1972, abandoned.

[52] U.S. Cl. ............................ 356/106 LR, 350/157
[51] Int. Cl. ............................................... G01b 9/02
[58] Field of Search ............... 356/106 LR; 350/157

[56] References Cited
UNITED STATES PATENTS

| | | | |
|---|---|---|---|
| 3,486,130 | 12/1969 | Macek | 356/106 LR |
| 3,473,031 | 10/1969 | White | 356/106 LR |
| 2,788,707 | 4/1957 | Land | 350/157 |

*Primary Examiner*—Ronald L. Wibert
*Assistant Examiner*—V. P. McGraw

[57] ABSTRACT

Ring laser beam locking is substantially eliminated by inserting an optical retardation plate into the circulating laser beams. The retardation plate is positioned with its optical axis perpendicular to the laser beams and is located at a point of minimum distance from the ring laser center of rotation. Further laser beam decoupling is achieved by mechanically vibrating the retardation plate.

5 Claims, 2 Drawing Figures

RING LASER UTILIZING AN OPTICAL RETARDATION PLATE TO PREVENT BEAM LOCKING

CROSS-REFERENCE TO RELATED INVENTION

This is a continuation-in-part of Application Ser. No. 248,754 filed 28 April 1972, and now abandoned.

BACKGROUND OF THE INVENTION

This invention relates to ring lasers, and in particular to means for preventing beam locking in such devices.

In the ring laser, two beams circulate, one clockwise and one counter-clockwise. At low angular velocities the two beams tend to lock and thus cease functioning as rotation sensors. This locking limits the use of the ring laser at low velocities. Two approaches to this problem are currently being used, but each has its disadvantages. The two approaches are the introduction of a mechanical dither and the use of Faraday cells. The mechanical dither carries with it a consequent increase in complexity and the introduction of noise. The Faraday cell depends on the Faraday effect whereby a material becomes optically active owing to the action of a magnetic field. This optical activity provides an additional symmetry between the clockwise and counterclockwise beams and so tends to prevent mode locking. However, it introduces six surfaces into the optical path and therefore increases scattering. Moreover, with both schemes there are increased power requirements.

SUMMARY OF THE INVENTION

Assymmetry is introduced between the clockwise and counterclockwise beams of a ring laser by a birefringent optical retardation plate that transversely intercepts the beams. Appropriate positioning of the retardation plate at a minimum distance from the ring laser center of rotation introduces a maximum relative velocity between the retardation plate and the beams when the ring laser is rotated. The relative velocity thus introduced effects an additional phase velocity shift between E and O ray components of the beams as they are transmitted through the retardation plate. This additional phase velocity shift tends to prevent locking of the beams. A second embodiment of the invention includes means for vibrating the retardation plate with respect to the source (or mirrors) in the ring.

It is a principal object of the invention to provide new and improved means for preventing beam locking in a ring laser.

It is another object of the invention to provide a low noise, simply constructed device for preventing beam locking in a ring laser.

It is another object of the invention to provide an optical ring laser beam decoupling device that introduces a minimum number of beam intercepting surfaces into the system optical path.

It is another object of the invention to provide means for preventing beam locking in a ring laser having lower power requirements than currently available beam decoupling devices.

These, together with other objects, features and advantages of the invention will become more apparent from the following detailed description when taken in conjunction with the illustrative embodiment in the accompanying drawings.

DETAILED DESCRIPTION OF THE PREFERRED EMBODIMENT

Figure 1:
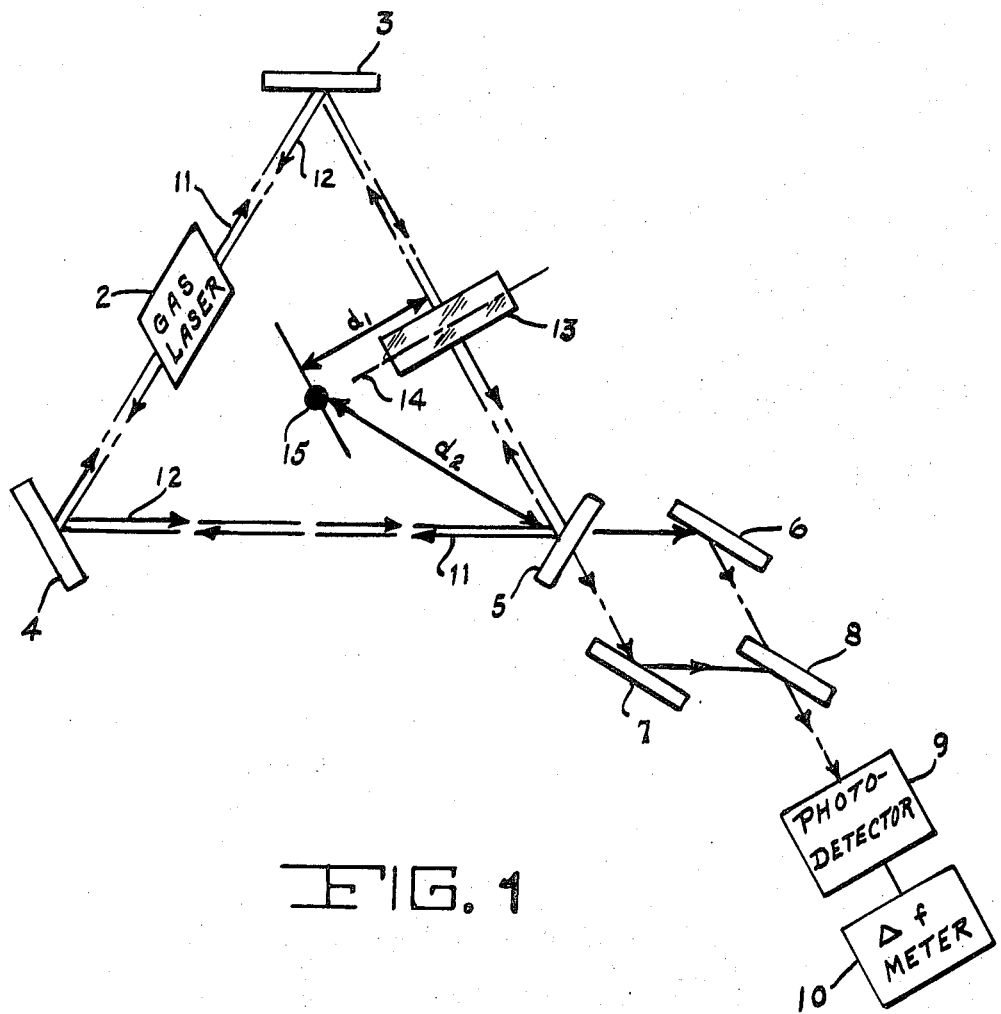
FIG. 1 illustrates a ring laser incorporating beam decoupling means of the type comprehended by the invention.

A ring laser system (or laser gyro) may be defined as a system in which radiation travels around a closed path formed by three or more reflectors. FIG. 1 of the drawings illustrates such a system. Laser 2 is constructed to emit at both ends. At each corner of the system the laser light is reflected to the next corner and back to the laser by reflectors 3, 4, and 5. Reflector 5 is a partial reflector that permits some light to be transmitted through it for measurement purposes. Light beam 11 travels around the "ring" from one end of the laser while light beam 12 from the laser's other end travels in the opposite direction. Reflectors 6 and 7 and prism 8 constitute the beam combining optics of the system. Photodetector 9 detects the combined beams and frequency meter 10 measures the frequency difference due to any ring laser rotation around center rotation 15.

In operation, when the ring laser system is stationary the time required for each beam to travel around the "ring" remains the same. If a rotational movement around the center of rotation 15 occurs, one laser beam travels a slightly longer path than the other, which results in a detectable change in frequency proportional to the rate of rotation. Generally, a frequency difference of about 15 KHz may be obtained from a path difference of 1 A.

It has been discovered that the problem of beam locking in ring lasers of this type can be obviated by inserting a birefringent optical retardation member (such as a calcite plate) into the laser beams. Such a device for preventing beam locking is illustrated by retardation plate 13. The essence of the invention resides in the combination of several heretofore unrecognized phenomena. These include the introduction of an additional phase velocity shift between the E and O ray components of a light beam transmitted through an optical retardation plate having relative motion with respect to the light beam; the introduction of relative motion between the retardation plate and the laser beams due to the unique geometric configuration of the ring laser and the discrete position of the retardation plate; and the fact that these phase velocity shifts for oppositely traveling beams add.

Optical retardation plates require an optically anisotropic material. Such materials are characterized by one or two preferred directions in the material which are called the optic axes. These give rise to the phenomenon of double refraction, whereby light is propagated in the material with two orthogonal directions for the electric vector. Two directions are designated as that of the E-ray (Extraordinary ray) and that of the O-ray (Ordinary ray).

These rays travel through the material at different phase velocities; that is, the surfaces of constant phase for the E-ray travel in the material at a speed different from that for the O-ray surfaces. If light is incident on a doubly refracting material perpendicular to the optic axis, the E- and O-rays which are formed in the crystal are not spatially separated as they propagate but do emerge from the crystal with a phase difference, $\Delta\phi$. If this phase difference equals $2\pi k + \pi 2$ (where $k$ is an integer), the crystal is a quarter wave plate and can convert linearly polarized light to circularly polarized light and the reverse. If $\Delta\phi$ equals $2\pi k + \pi 2$, the crystal is a half-wave plate and is used to change the direction of the electric vector of linearly polarized light.

An analysis of the effect of motion of the plate on this retardation predicts an additional retardation beyond that for the stationary plate. The phase difference $\Delta\phi$ for the stationary case is given by $$\Delta\phi = 2\pi (t_e/\tau_e - t_o/\tau_o) \quad (1)$$

$$= 2\pi (d/w_e\tau_e - d/w_o\tau_o) \quad (2)$$

where $w$ is a phase velocity, $\tau$ the period of the propagating light, $d$ the plate thickness and $t$ the time required for the light to travel through the plate. The subscripts $e$ and $o$ refer to the E-ray and O-ray respectively. To compute the phase difference for a plate moving with velocity $v$ with respect to the source the Lorentz transformations for phase velocity are used. When the transformations are applied the phase shift $\Delta\phi'$ for the moving plates is given in terms of the shift for the stationary plate as $$\Delta\phi' = \tau\phi\, 1 + v/c\, (n_3 + n_o) = \Delta\phi + \sigma\phi \quad (3)$$

where $n_e$ and $n_o$ are the indices of refraction for the E-ray and O-ray respectively, $c$ the velocity of light and $\sigma\phi$ the additional phase velocity shift due to the plate motion. A detailed derivation of Equation (3) is disclosed in my copending patent application Ser. No. 248,585, entitled, Method and Apparatus For Measuring the Velocity of a Moving Object, filed on 28 April 1972.

In accordance with the present invention beam locking is prevented by introducing the additional phase velocity shift $\Delta\phi$ into the laser beams when rotational motion of the ring laser occurs. Retardation plate 13 is therefore preferably inserted into the laser ring at a point of minimum distance from the system center of rotation. This maximizes the difference between plate travel radius $d1$ and mirror travel radius $d2$ thereby providing maximum relative retardation plate to beam velocity. It is also preferable that the optical axis 14 of retardation plate 13 be perpendicular to the laser beams. Multiple retardation plates can be used in such a system. However, a single thick plate has the advantage of introducing a minimum number of beam intercepting surfaces into the system. Retardation plates whose thickness range from one to ten centimeters are effective for the purpose of the invention.

A second approach to beam decoupling comprehended by the invention consists of placing a retardation plate in the ring and vibrating it with respect to the beam source (or ring laser mirrors). Additional relative velocity is thus provided by the retardation plate vibration. A typical ring laser beam lock-in is 5°/sec. For a ring 10 cm in radius this corresponds to a translational velocity of approximately 1 cm/sec. A factor of $10^3$ corresponds to a velocity of 10 m/sec only, which is readily attainable and would lead to a $\sigma v$ of the same order as the lock-in threshold.

Therefore by placing a vibrating retarder in the ring the beat frequency between the beams will be increased for a given rotation velocity. Since the vibration velocity would be sinusoidal, it would impose a frequency modulation on the rotational beat frequency. Such a known modulation is, however, easily removable from the signal corresponding to the rotation.

Figure 2:
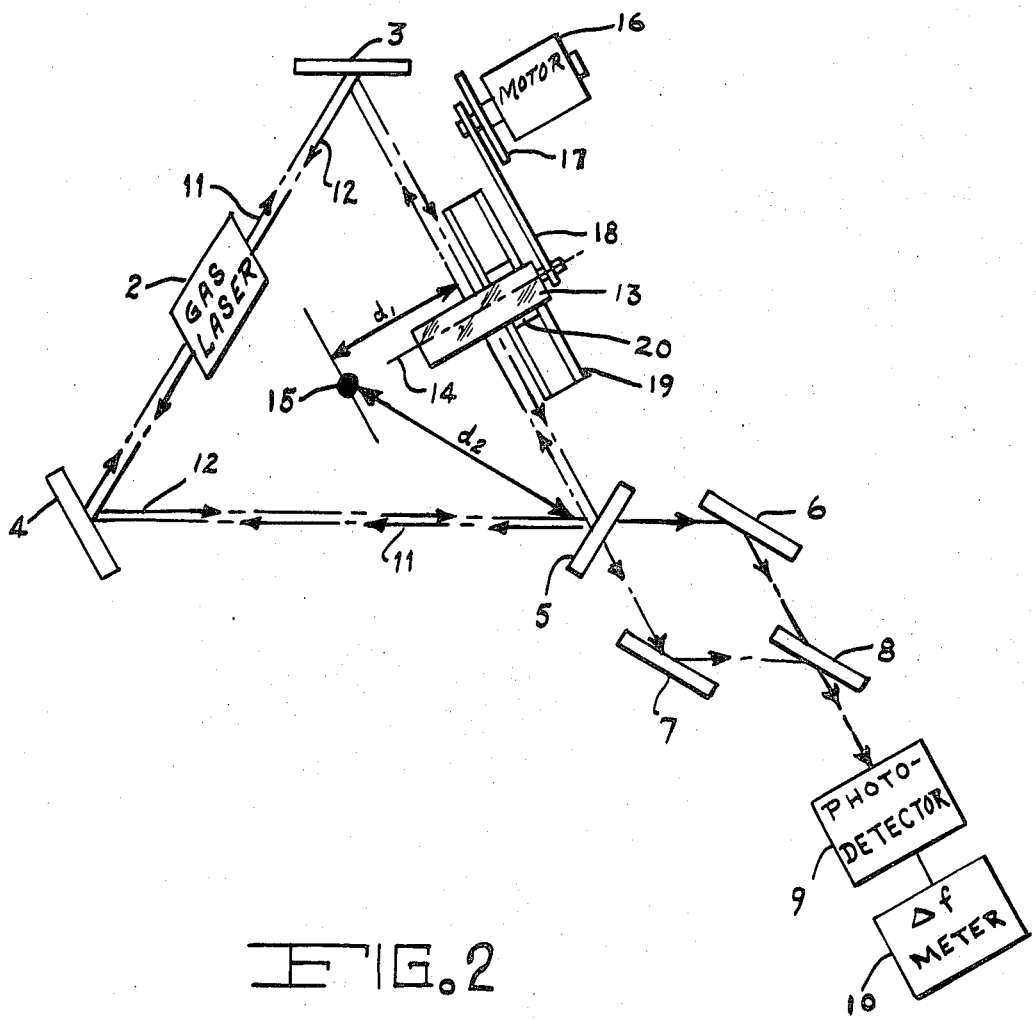
FIG. 2 illustrates a second embodiment of the invention having apparatus for vibrating the beam decoupling means.

FIG. 2 illustrates means for realizing this concept. Retardation plate 13 is mounted on slide 20 which rides freely in track member 19. Disc member 17 is mounted on motor 16. Link member 18 is connected between retardation plate 13 and a peripheral point on disc member 17. The rotational motion of the motor shaft is thus converted into reciprocating linear motion of the retardation plate.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The combination of a ring laser having means for radiating and circulating proximate clockwise and counterclockwise laser beams around the ring laser center of rotation and a device for preventing beam locking therein, said device for preventing beam locking comprising a single birefringent optical retardation member disposed in intercepting relationship with said laser beams.

2. The combination of a ring laser and device for preventing beam locking defined in claim 1 wherein the optical axis of said retardation member is in perpendicular relationship to said laser beams.

3. The combination of a ring laser and device for preventing beam locking defined in claim 2 wherein said retardation member is disposed at a point of minimum distance from the ring laser center of rotation.

4. The combination of a ring laser and device for preventing beam locking defined in claim 3 wherein said retardation member comprises a calcite plate having a thickness that is not less than 1 centimeter and not greater than ten centimeters.

5. The combination of a ring laser and device for preventing beam locking defined in claim 4 including means for vibrating said retardation member.

* * * * *